3,397,162
NON-BLOCKING WATER-SOLUBLE POLYVINYL ALCOHOL FILMS
Bin Takigawa, Nobuaki Sakamoto, and Shigeto Miyoshi, Tokyo, Japan, assignors to Denki Kagaku Kogyo Kabushiki Kaisha, Tokyo, Japan
No Drawing. Filed Mar. 1, 1965, Ser. No. 436,341
Claims priority, application Japan, June 18, 1964, 39/34,072
9 Claims. (Cl. 260—23)

ABSTRACT OF THE DISCLOSURE

The provision of water soluble polyvinyl alcohol films having no self-adhesion in high humidity by incorporating an additive selected from the group consisting of monobasic higher fatty acids having more than 10 carbon atoms, their sodium salts, their lauryl esters, their methylol amides and higher aliphatic alcohols having more than 10 carbon atoms to water soluble polyvinyl alcohol.

---

This invention relates to preventing the adhesion of water soluble polyvinyl alcohol film which is made by melt extrusion.

It is known that polyvinyl alcohol (abridged as PVA hereinafter) can be utilized as a water soluble film by the so-called casting process wherein an aqueous solution of PVA is cast and then dried because the PVA containing acetic acid radicals to a certain extent dissolves easily in cold water.

The inventors have found that a water soluble PVA film can be manufactured economically and advantageously by the melt extrusion process, which could never be attained before with PVA under the anhydrous condition by using a modified partially saponified PVA. According to the melt extrusion process, not only sheet film but also cylindrical film can be manufactured from PVA.

However, it has been observed that a PVA film manufactured by the melt extrusion process absorbs moisture in the air and adheres to itself and other material in high humidity.

For the film manufactured by the casting process, it is known to subject a surface of the sheet to aventurine processing or to a process in which aliphatic dicarboxylic acid having some water solubility is added to an aqueous solution of PVA. Such process is not always effective in the manufacture of water soluble PVA film by the melt extrusion method however. Namely, for the inner surface of cylindrical film which is manufactured by the melt extrusion method, it is difficult to attain an effective prevention of adhesion by the aventurine processing and the addition of said dicarboxylic acid does not show a great effect as shown in the control example described hereinafter.

As a result of various investigations with regard to a process for preventing the adhesion of water soluble films made by the melt extrusion process the inventors have found that the adhesion of film can be prevented extremely without decreasing the solubility of film in water by adding one or more members selected from the group consisting of monobasic higher fatty acids having more than 10 carbon atoms, salts, esters, amides, or methylol amides thereof, and higher alcohol having more than 10 carbon atoms.

More particularly, the invention consists of mixing one or more of the above noted materials with powders of PVA by sufficient dispersion in the case of melt extrusion of PVA. It is not necessary to add these compounds in a great amount and in general a mixing ratio below 1% shows a sufficient reduction of adhesion. The use of said compounds in great amounts makes the films turbid and shows less effect in preventing the adhesion as expected.

When a PVA film in which such additives are dispersed thoroughly is melt extruded, a film having reduced adhesion may be obtained.

According to the invention, a sufficient reduction in the adhesion can be attained with an amount of said additives and the interior adhesion of cylindrical film can be prevented which could never be attained before. Even if the present film is left for a long time, the effect is not reduced and the additives do not separate on the surface of film to form turbidness.

EXAMPLE

A mixed liquid of 9 parts of vinyl acetate, 1 part of ethylene glycol, 2 parts of methanol and 0.005 part of azobisisobutyronitrile was polymerized at a polymerization temperature of 65° C. for 8 hours and the vinyl acetate monomer was distilled off by conventional method after the polymerization. A methanolic solution of polymer of 45% concentration was then prepared and saponified with caustic soda of $\frac{1}{20}$ equivalent per mol of vinyl acetate at a temperature of 25° C. to yield PVA having a polymerization degree of 900 and residual acetic acid radical of 16 mol percent.

To the resulting PVA was added a solution of each agent shown in the following table in methanol or in a mixture of methanol and acetone, and dried in a vacuum drier at 60° C. and under a reduced pressure of 10 mm. Hg after mixing thoroughly.

The dried PVA was thrown into a melt extruder heated at 200° C. of 15 mm. screw diameter and 300 mm. length ($L/D=20$) and molded at a rate of 200 g. per hour from a ring die of 25 mm. diameter and 0.3 mm. clearance to yield a colorless, transparent and water soluble film.

Two sheets of said film were plied under a load of 95 g./cm.$^2$, left for 20 hours in a thermo-hygrostat at 20° C. and 80% RH and then the strength for stripping the films was determined to observe the effect of preventing the adhesion. The results are shown in the following table.

TABLE

| No. | Additive | Amount added (wt. percent) based on wt. of PVA | Strength of stripping film (g./cm.) |
|---|---|---|---|
| 1 | None | | 54.8 |
| 2 | Lauric acid | 1.0 | 7.3 |
| 3 | Stearic acid | 1.0 | 3.1 |
| 4 | do | 0.75 | 3.2 |
| 5 | do | 0.5 | 9.3 |
| 6 | Linoleic acid | 1.0 | 11.7 |
| 7 | Sodium stearate | 0.5 | 8.7 |
| 8 | Stearyl alcohol | 0.2 | 13.6 |
| 9 | Stearic acid amide | 1.0 | 2.3 |
| 10 | Stearic acid methylol amide | 1.0 | 3.5 |
| 11 | Laurylstearate | 0.2 | 4.3 |
| 12 | Stearic acid+stearic acid amide | 0.5+0.5 | 2.3 |
| Control 1 | Caprylic acid | 1.0 | 44.3 |
| Control 1 | Sebacic acid | 1.0 | 36.9 |

It is obvious from the results that the addition of one or more of monobasic higher fatty acid having more than 10 carbon atoms, salt, ester, amide, or methylol amide thereof, and higher alcohol having more than 10 carbon atoms shows sufficient effects on the prevention of adhesion of water soluble PVA film made by the melt extrusion process.

What we claim is:

1. A composition for preparing a non-adhesive water soluble film comprising a mixture of water soluble polyvinyl alcohol, and at least one additive selected from the group consisting of a monobasic higher fatty acid having more than 10 carbon atoms, the sodium-salts thereof, the lauryl esters thereof, methylol amides thereof and higher aliphatic alcohols having more than 10 carbon atoms, said additive being present in an amount from 0.2–1.0% by weight of the said polyvinyl alcohol.

2. A composition according to claim 1, wherein said acid is lauric acid.

3. A composition according to claim 1, wherein said acid is stearic acid.

4. A composition according to claim 1, wherein said acid is linoleic acid.

5. A composition according to claim 1, wherein said sodium-salt is sodium stearate.

6. A composition according to claim 1, wherein said aliphatic alcohol is stearyl alcohol.

7. A composition according to claim 1, wherein said methylol amide is stearic acid methylol amide.

8. A composition according to claim 1, wherein said ester is lauryl stearate.

9. Non-adhesive water-soluble films made from the composition of claim 1.

References Cited

UNITED STATES PATENTS

| | | | |
|---|---|---|---|
| 3,316,190 | 4/1967 | Suzumura et al. | 260—17.4 |
| 2,948,697 | 9/1960 | Robertson | 260—29.2 |
| 3,148,166 | 9/1964 | Suzumura et al. | 260—31.2 |
| 3,218,284 | 11/1965 | Gardner | 260—31.2 |
| 3,280,235 | 10/1966 | Dighton et al. | 264—95 |
| 3,287,313 | 11/1966 | Imoto | 260—41 |

DONALD E. CZAJA, *Primary Examiner.*

R. A. WHITE, *Assistant Examiner.*